(12) United States Patent
Maruoka

(10) Patent No.: US 6,551,201 B2
(45) Date of Patent: *Apr. 22, 2003

(54) VULCANIZED THREAD RUBBER COMPOSITION AND GOLF BALL USING THE SAME

(75) Inventor: Kiyoto Maruoka, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 09/845,175

(22) Filed: May 1, 2001

(65) Prior Publication Data

US 2001/0051551 A1 Dec. 13, 2001

(30) Foreign Application Priority Data

| May 1, 2000 | (JP) | ............ 2000-132160 |
| Aug. 22, 2000 | (JP) | ............ 2000-251275 |

(51) Int. Cl.⁷ ............ A63B 37/06; A63B 37/00
(52) U.S. Cl. ............ 473/357; 473/356; 473/351
(58) Field of Search ............ 473/351, 356–366; 525/332.6, 332.7

(56) References Cited

U.S. PATENT DOCUMENTS

| 4,353,557 A | | 10/1982 | Kajita et al. | |
| 4,696,475 A | * | 9/1987 | Tomita et al. | ............ 473/365 |
| 5,037,104 A | * | 8/1991 | Watanabe et al. | ...... 260/998.14 |
| 5,340,112 A | * | 8/1994 | Hamada et al. | ........ 260/998.14 |
| 5,346,223 A | * | 9/1994 | Hamada et al. | ............ 473/354 |
| 5,421,580 A | | 6/1995 | Sugimoto et al. | |
| 5,816,939 A | | 10/1998 | Hamada et al. | |
| 5,861,465 A | * | 1/1999 | Hamada et al. | ............ 473/356 |

FOREIGN PATENT DOCUMENTS

JP        B2541272        6/1993

OTHER PUBLICATIONS

Callister, Jr., William D., Materials Science and Engineering: An introduction, 4$^{th}$ Edition., New York: John Wiley & Sons, Inc., copyright 1997, pp. 452–453.*

* cited by examiner

Primary Examiner—Paul T. Sewell
Assistant Examiner—Alvin A. Hunter
(74) Attorney, Agent, or Firm—Birch, Stewart, Kolasch & Birch, LLP

(57) ABSTRACT

A thread rubber exhibiting good impact resilience in an elongated state, and a golf ball using such thread rubber are provided. The vulcanized thread rubber composition is obtained by vulcanizing a thread rubber composition including at least 50 wt % of polyisoprene rubber having a cis 1,4 bond content of 80–95% and a trans 1,4 bond content of 2–4% within a rubber component. In the vulcanizate, a ratio of a crosslinked density of polysulfide bonds with respect to a total crosslinked density is more than 70%. The golf ball is made using this vulcanized thread rubber composition.

7 Claims, 3 Drawing Sheets

VULCANIZED THREAD RUBBER COMPOSITION AND GOLF BALL USING THE SAME

BACKGROUND OF THE INVENTION

1. Field of the Invention

The present invention relates to a vulcanized thread rubber composition and a golf ball using the vulcanized thread rubber composition excellent in rebound characteristics.

2. Description of the Background Art

Golf balls are generally classified into two categories: thread-wound golf balls having a center wound with thread rubber as its core material which is enveloped by a cover; and solid golf balls having a core material of solid rubber which is enveloped by a cover. The thread-wound golf balls are superior in shot feeling and controllability, while the solid golf balls are superior in flight performance and durability.

The thread-wound golf balls exhibiting such favorable controllability have often been employed by advanced amateur golfers and professional golfers. However, ordinary amateur golfers are reluctant to use the thread-wound golf balls because of their inferior flight performance. Thus, improvement of the flight performance of the thread-wound golf balls has been a critical issue.

Conceivable ways to improve the flight performance of a thread-wound golf ball include the one to improve impact resilience of the golf ball and the one to reduce the spin rate thereof. For example, U.S. Pat. No. 5,816,939 discloses a technique to improve the impact resilience, in which a thread rubber for a golf ball having a retention of tensile strength after aging at 70° C. for seven days of at least 70%, a hysteresis loss at a 100 kg/cm$^2$ constant stress tensile of at least 50%, and an elongation at the same time of 900% to 1400% is provided.

U.S. Pat. No. 4,353,557 discloses a technique to provide a thread rubber formed of a rubber composition having 2–20 parts by weight of carbon black blended with respect to 100 parts by weight of natural rubber and/or cis 1,4-polyisoprene.

Japanese Patent Publication No. 5-41272 discloses a technique to provide a thread rubber including isoprene-butadiene random copolymer having a cis 1,4 bond content of at least 80 wt % as a rubber component.

A technique to improve the flight performance by reducing the spin rate of the golf ball is disclosed, for example, in U.S. Pat. No. 5,421,580, in which a golf ball having a liquid center whose diameter is 29.5 mm to 32.0 mm and the total capacity of dimples of 280 mm$^3$ to 340 mm$^3$ is provided.

Thread rubber is generally elongated by 800 to 1100% when it is wound around a center during a manufacturing process of a golf ball. When the thread rubber is elongated, rubber molecules tend to be orientated uniformly in the elongated direction, so that crystallization takes place. As a result, rubber elasticity is lost, thereby decreasing the impact resilience of the golf ball. Based on such knowledge, a thread rubber having high impact resilience at the elongated state is highly demanded.

Further, if the thread rubber breaks during the elongated state, productivity is considerably decreased. Thus, prescribed elongation percentage and strength are required for the thread rubber. Still further, prescribed tensile resilience is required for the thread rubber in the elongated state so as to retain sufficient hardness for the golf ball.

SUMMARY OF THE INVENTION

The present invention is directed to solve the above-described problems. An object of the present invention is to provide a thread rubber excellent in impact resilience at the elongated state that can suppress breakage during a winding step, and a golf ball employing such thread rubber.

According to an aspect of the present invention, a vulcanized thread rubber composition is obtained by vulcanizing a thread rubber composition including at least 50 wt % of polyisoprene rubber having a cis 1,4 bond content of 80% to 95% and a trans 1,4 bond content of 2% to 4% within a rubber component. In the thread rubber composition, a ratio of a crosslinked density of polysulfide bonds with respect to a total crosslinked density in the vulcanizate is more than 70%.

Preferably, the crosslinked density of the polysulfide bonds is in a range between $0.8 \times 10^{-8}$ mol/mm$^3$ and $3 \times 10^{-8}$ mol/mm$^3$.

Still preferably, an average cis 1,4 bond content within the rubber component is 90–96% and an average trans 1,4 bond content within the rubber component is 0.5–3.0%.

Preferably, the total crosslinked density of the vulcanized thread rubber composition is between $0.8 \times 10^{-8}$ mol/mm$^3$ and $3 \times 10^{-8}$ mol/mm$^3$, and the ratio of crosslinked density of the polysulfide bonds is more than 70%.

Still preferably, the vulcanized thread rubber composition is produced by continuous vulcanization, at a pressure of 0.3–1 MPa and a temperature of 140–160° C.

Preferably, a ratio of a blended amount of vulcanization accelerator with respect to a blended amount of sulfur (vulcanization accelerator/sulfur) in the rubber composition before vulcanization is less than 2.

According to another aspect of the present invention, a golf ball is obtained by elongating the vulcanized thread rubber composition described above to wind it around a center to form a core material, and enveloping the core material with a cover.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
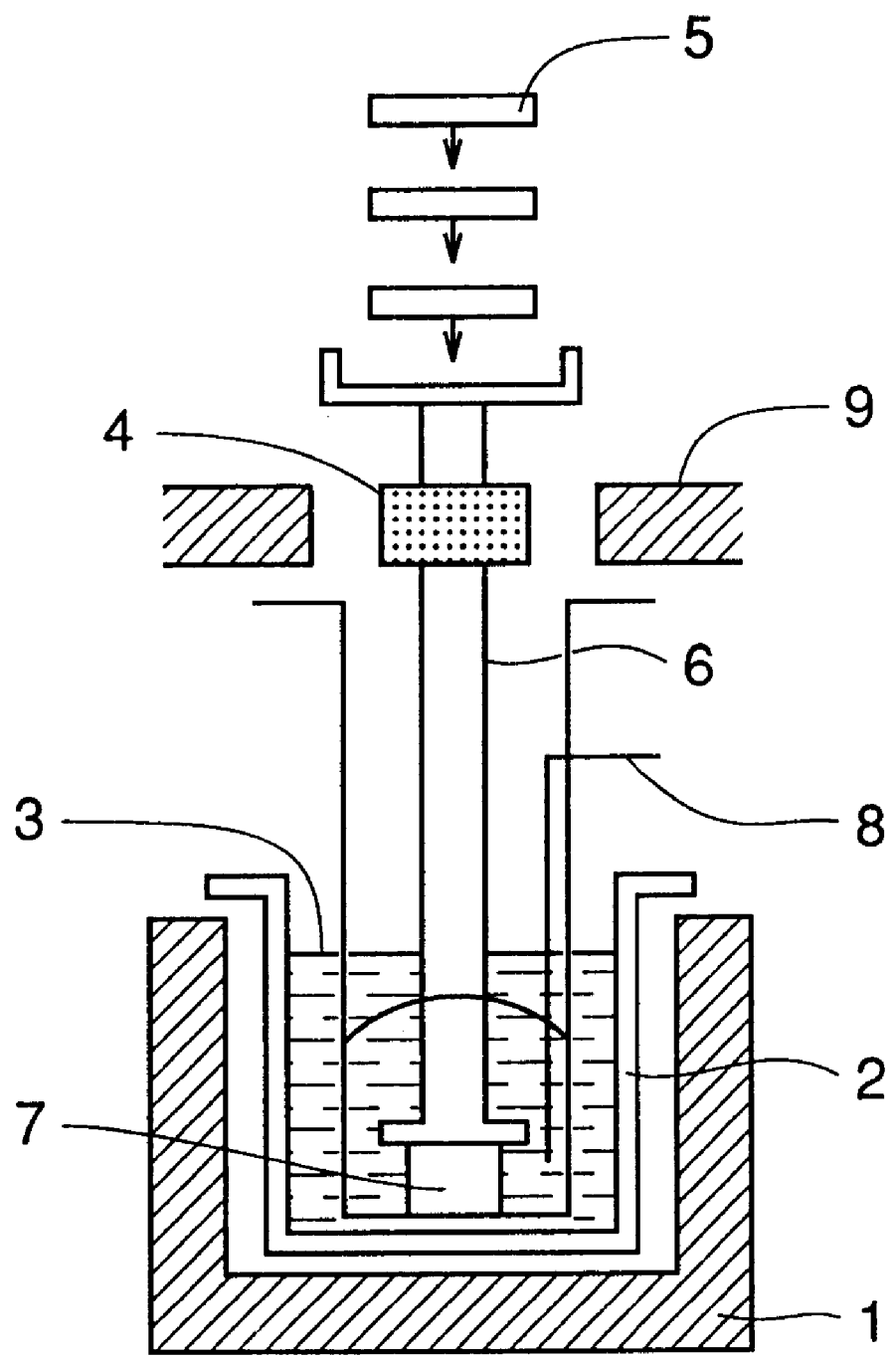
FIG. 1 schematically shows a TMA (Themo-mechanical Analyzer) device for use in measurement of crosslinked density.

Polyisoprene rubber used in the thread rubber composition according to the present invention has a cis 1,4 bond content in a range from 80% to 95%, and preferably from 90% to 95%.

It has conventionally been said that, since a cis 1,4 bond content of a higher level serves to increase rubber elasticity, it is advantageous to use polyisoprene rubber having a high level of cis 1,4 bond content for a golf ball in order to increase its impact resilience. When fabricating a thread-wound golf ball, however, thread rubber is elongated by 1000–1400% when it is wound around a center. Thus, the rubber elasticity in such an elongated state should be taken into account. The inventor has found that, in the case of the cis 1,4 bond content exceeding 95%, when the thread rubber is elongated, rubber molecules tend to be orientated in the elongated direction, so that crystallization occurs. This considerably degrades the rubber elasticity, thereby degrading the impact resilience of the golf ball. If the cis 1,4 bond content is small, crystallization due to elongation of the thread rubber is less obvious, causing less degradation of the rubber elasticity. However, the rubber elasticity in its original state is small, so that high impact resilience cannot be expected in the elongated state. Accordingly, the cis 1,4 bond content of at least 80% is necessary.

The polyisoprene rubber has a trans 1,4 bond content of from 2% to 4%. The trans 1,4 bond has a steric structure exhibiting high crystallinity in a not-elongated state. Thus, the rubber elasticity will not be degraded even if the thread rubber is elongated. It means that, by incorporating the trans 1,4 bond of at least 2%, the decrease of the rubber elasticity when the thread rubber is being elongated can be suppressed. However, the trans 1,4 bond content exceeding 4% is not preferable, since the rubber elasticity in the not-elongated state will be degraded. The present invention requires that the polyisoprene rubber described above be included at least 50 wt % in the rubber component.

Other rubber components that may be used in the thread rubber composition according to the present invention include natural rubber, isoprene rubber, butadiene rubber and others. In the case of the mixture of rubber components, it has an average cis 1,4 bond content in a range between 90.0% and 98.0%.

The average cis 1,4 bond content of the mixture of rubber components is obtained as an average of the cis 1,4 bond contents in the respective rubber components that is weighted according to their blended amounts. For example, with a mixture of 80 parts by weight of polyisoprene rubber having the cis 1,4 bond content of 92% and 20 parts by weight of natural rubber having the cis 1,4 bond content of 95%, the weighted average thereof is calculated as follows.

The average cis 1,4 bond content of the rubber components=92×0.8+95×0.2=92.6

If the average cis 1,4 bond content of the rubber component is less than 90.0%, the decrease in impact resilience at the elongated state is small. However, this rubber component has poor impact resilience in its original, not-elongated state, so that a golf ball exhibiting favorable flight performance cannot be obtained. If the cis 1,4 bond content of the rubber component exceeds 95.0%, crystallization will occur when being elongated, due to orientation of rubber molecules in the elongated direction, so that the rubber elasticity will considerably be degraded. The average cis 1,4 bond content is preferably in a range between 90.0% and 93.0%.

In the case of the mixture of rubber components, the average trans 1,4 bond content in the rubber components is preferably in a range between 1.5% and 3.0%. As described above, the trans 1,4 bond originally has a steric structure exhibiting high crystallinity, which will not be affected by elongation of the thread rubber. Thus, the degradation of rubber elasticity is not expected. However, if the trans 1,4 bond is included in a molecule, it will adversely affect the impact resilience. Accordingly, the average trans 1,4 bond content is preferably in a range between 1.5% and 3.0%, and more preferably in a range between 2.3% and 3.0%.

Here, the cis 1,4 bond content and the trans 1,4 bond content are determined employing a nuclear magnetic resonance (NMR) device, by quantitative analysis with a known method.

In the thread rubber after vulcanization according to the present invention, the crosslinked density of polysulfide bonds in the entire crosslinked structure is in a range between $0.8 \times 10^{-8}$ mol/mm$^3$ and $3 \times 10^{-8}$ mol/mm$^3$. The total crosslinked density of the vulcanized thread rubber composition is preferably between $0.8 \times 10^{-8}$ mol/mm$^3$ and $3 \times 10^{-8}$ mol/mm$^3$.

Here, the polysulfide bond refers to a structure in which rubber molecules are crosslinked by means of two or more sulfur.

When the total crosslinked density is expressed as ($\nu$T) and the crosslinked density of the polysulfide bonds is expressed as ($\nu$P), the ratio (R) of the polysulfide bonds can be calculated by the following expression (I).

$$R = \nu P / \nu T \times 100(\%) \tag{I}$$

Here, when the crosslinked density of monosulfide bonds is expressed as ($\nu$M), the crosslinked density ($\nu$P) of the polysulfide bonds is calculated by the following expression (II).

$$\nu P = \nu T - \nu M \tag{II}$$

The calculation of crosslinked density is performed as follows. First, a test piece in a circular cylinder shape having a diameter of 3 mm is punched from a vulcanized rubber sheet before being cut into thread rubber. This test piece is immersed in acetone at 20° C. for 24 hours, and oil and antioxidant are extracted. The test piece after the extraction is then immersed in a solvent with tetrahydrofuran (THF) and benzene mixed by 1:1 in the mass ratio, at 20° C. for 24 hours for swelling. Next, the test piece is introduced into a TMA device (FIG. 1) that is filled with the solvent with tetrahydrofuran (THF) and benzene mixed by 1:1 in the mass ratio at 20° C. Using this TMA device, a value of ($\tau 0/(1/\alpha 2 - \alpha)$) is obtained from the relation between compressive stress and strain. The numerical value thus obtained and various dimensions of the test piece are substituted to the theoretical formula of Flory, i.e., an expression (III) below, so that the total crosslinked density ($\nu$T) of the thread rubber is obtained. The test is conducted for three test pieces, and an average is obtained from the results.

The method for calculating the crosslinked density ($\nu$M) of the monosulfide bonds is identical to that for the crosslinked density ($\nu$T) described above, except that LiAlH catalyst is added to the 1:1-mixed solvent of tetrahydrofuran and benzene in which the test piece is immersed for swelling. The calculation of the crosslinked density ($\nu$M) is again conducted using the expression (III). At this time, ($\nu$T) in the expression (III) is replaced with ($\nu$M).

$$\nu_T = \frac{\nu e'}{V0'} = \frac{\tau_0}{RT\left(\alpha - \frac{1}{\alpha^2}\right)} \sqrt[3]{\frac{1-\phi}{(Ls0/L0)^3 - \phi}} \tag{III}$$

$\tau_0$: Stress=F/A0 [g/mm$^2$]
f: Stress [g]
ve: Number of crosslinks [number]
ve': Number of crosslinks [mol]
k: Boltzmann constant: $1.381 \times 10^{-23}$ [J/K]
R: Gas constant: 8.314 [J/mol·K]→R=k·Na (Na: Avogadro's number=$6.02 \times 10^{23}$ mol$^{-1}$)
T: Temperature at measurement [K]
V0: Total volume of sample [mm$^3$]
V0': Volume of pure rubber polymer=V0(1−$\phi$) [mm$^3$]
$\phi$: Volume ratio of filler (volume of filler/total volume of rubber)

α: Compressibility of sample after swelling=Ls/Ls0
L0: Height of sample before swelling [mm]
Ls: Height of compressed sample after swelling [mm]
Ls0: Height of sample after swelling [mm]
A0: Area of end surface of sample before swelling [mm$^2$]
A1: Area of end surface of sample after swelling=A0 (LS0/L0) [mm$^2$]
wherein $\tau_0$ is obtained as follows:

$$\tau_0 = \frac{RTve'}{VO'} \sqrt[3]{\frac{(Ls0/L0)^3 - \phi}{1 - \phi}} \left(\alpha - \frac{1}{\alpha^2}\right)$$

In the present invention, the ratio of the polysulfide bonds with respect to the total crosslinks is more than 70%, and preferably at least 85%. With the crosslinks formed by the polysulfide bonds, crystallization due to orientation of rubber molecules is unlikely to occur even if the thread rubber is elongated. Thus, the degradation of rubber elasticity can be suppressed.

To that end, the blended amount of sulfur is made greater than the blended amount of the vulcanization accelerator. In the case where rubber molecules are being crosslinked by means of sulfur, the crosslinks will be formed by polysulfide bonds if the blended amount of sulfur is made large and the blended amount of vulcanization accelerator is made small. On the contrary, if the blended amount of sulfur is made small and the blended amount of vulcanization accelerator is made large, the crosslinks will be formed by monosulfide bonds. Here, the crosslinks formed by the polysulfide bonds is desirable to increase the impact resilience of the thread rubber composition. Accordingly, the ratio of their blended amounts (vulcanization accelerator/sulfur) is set less than 2, preferably between 0.1 and 0.9, and more preferably between 0.2 and 0.5.

Sulfur is blended 0.8–5.0 parts by weight with respect to 100 parts by weight of the thread rubber composition. If the blended amount of sulfur is less than 0.8 parts by weight, the vulcanized density of the thread rubber becomes small, so that the favorable fundamental characteristics of, e.g., tensile strength and modulus cannot be obtained. If it exceeds 5.0 parts by weight, the modulus of the thread rubber becomes too high, so that sufficient elongation cannot be expected. Further, bloom will take place, which will promote aging.

The vulcanization accelerator for use in the present invention is not limited to a specific type. Those of thiuram type, guanidine type, thiazole type and sufenamide type, conventionally utilized for thread rubber compositions for golf balls, can be employed. The blended amount of the vulcanization accelerator is preferably 0.4–2.0 parts by weight, and more preferably 0.6–2.0 parts by weight. If it is less than 0.4 parts by weight, sufficient modulus for the thread rubber cannot be obtained, and therefore, when used for a golf ball, high impact resilience cannot be expected. If it exceeds 2.0 parts by weight, the modulus of the thread rubber will become too high, which decreases elongation thereof, making it difficult to tightly wind the thread rubber around the center.

Besides the ingredients as described above, the following ingredients are blended in the thread rubber used in the present invention where appropriate: stearic acid, zinc oxide, reinforcing agents such as carbon black, white carbon and precipitated calcium carbonate, fillers such as calcium carbonate and diatomite, plasticizers such as dioctyl phthalate and tricresyl phosphate, colorants, slip additives, specific gravity adjusting agents, and antioxidants.

The thread rubber of the present invention is obtained through kneading, extruding and calendering steps of rubber composition, and vulcanizing and cutting steps of the obtained rubber sheet.

First, in the kneading step, vulcanizing agents, additives and others are added to a base rubber component, which is kneaded to obtain a rubber composition. For this kneading step, any of closed type kneading apparatuses such as kneader and Banbury mixer, open rolls and others may be utilized.

Figure 2:
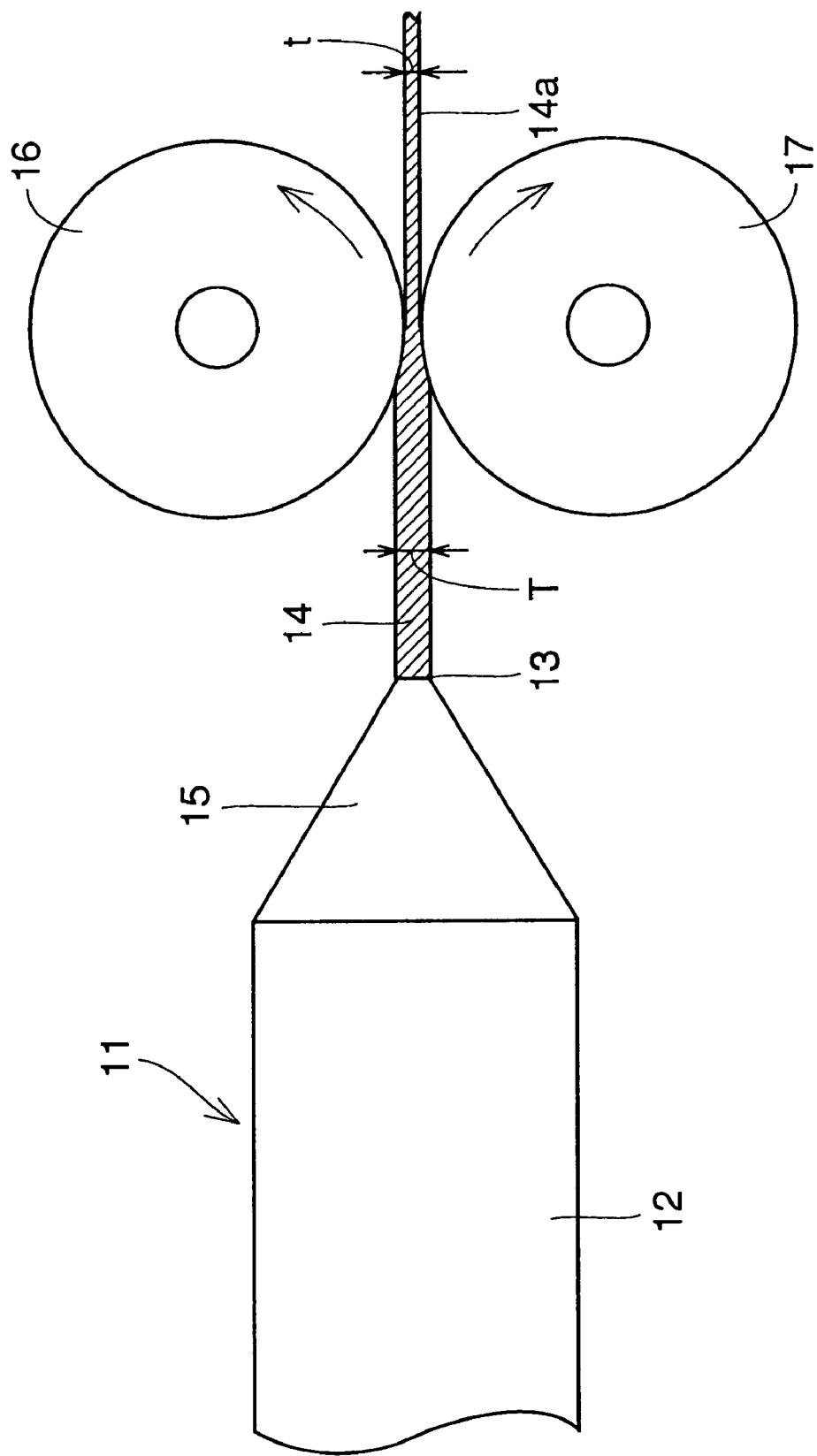
FIG. 2 schematically illustrates an extruding step in manufacture of thread rubber.

Next, in the extruding step, the rubber composition obtained in the kneading step is introduced into a cylinder 12 of an extruder 11 shown in FIG. 2, and extruded from a discharge opening 13 located in the head portion to form a sheet material 14. As the extruder is employed, the sheet material with even thickness can be obtained. As the extruder, a screw type uniaxial extruder is preferably employed. The extruder of this type suppresses orientation of rubber molecules, so that the extruded sheet material 14 suffers less contraction, and irregularities in thickness thereof can be prevented. The rotation speed of the screw of the screw type uniaxial extruder is generally set from 1 rpm to 60 rpm.

The internal temperature of cylinder 12 is preferably from 50° C. to 100° C., and more preferably from 60° C. to 70° C. As the internal temperature of cylinder 12 is kept within the range, irregularities of the surface of sheet material 14 are alleviated, and rubber burning is prevented. The internal temperature of the head portion 15 is preferably from 80° C. to 110° C. Keeping the internal temperature of head portion 15 also allows alleviation of irregularities of the surface of sheet material 14 and prevention of rubber burning. Further, a mesh is preferably placed inside the cylinder 12 so as to remove foreign particles within the rubber composition. Although a finer mesh would be advantageous in removing the foreign particles, too fine a mesh will prevent the rubber composition from passing therethrough, and thus, heat will be generated, causing rubber burning. Accordingly, a mesh from #60 to #120 is preferable.

The thickness T of sheet material 14 extruded from discharge opening 13 is from 1 mm to 8 mm, and preferably from 2 mm to 6 mm. If the thickness T is less than 1 mm, rubber supply may become insufficient, causing unstable thickness in the subsequent rolling step. If it exceeds 8 mm, it will become necessary to considerably thin the sheet material in the rolling step. This may cause unevenness in thickness of the thin sheet material.

Sheet material 14 obtained in the extruding step is passed to a calendering step employing a pair of upper roll 16 and lower roll 17. These upper roll 16 and lower roll 17 rotate in the opposite directions from each other, as shown by arrows in FIG. 2. Sheet material 14 is subjected to the rolling process while being passed between upper roll 16 and lower roll 17, so that a thin sheet 14 a is obtained. Here, the extruding step and the calendering step are performed continuously. Therefore, the temperature of sheet material 14 obtained in the extruding step is kept while the rolling process is conducted, so that it becomes unnecessary to heat the sheet material 14 before the rolling process. A temporary storing space for sheet material 14 also becomes unnecessary. The temperatures of upper roll 16 and lower roll 17 in the calendering step are preferably made approximately equal to the temperature of head portion 15 of the extruder in the extruding step.

The thickness t of thin sheet material 14a obtained in the calendering step is preferably from 0.3 mm to 0.6 mm, and more preferably from 0.45 mm to 0.55 mm. If the thickness t is less than 0.3 mm, the thread rubber is likely to break when it is being wound to form a core material in the golf ball manufacturing process. If the thickness t exceeds 0.6 mm, it becomes difficult to elongate the thread rubber when winding it around a center to form the core material, thereby causing an insufficient winding density of thread rubber in the core material. The golf ball having a core material whose thread rubber winding density is small is insufficient in hardness, so that the coefficient of restitution thereof becomes small. The thickness t of thin sheet material 14a is approximately equal to the thickness of the thread rubber obtained by vulcanization.

In particular, the thickness of thin sheet material 14a of 0.5±0.1 mm with a standard deviation σ of not greater than 0.02 is preferable. If the standard deviation σ exceeds 0.02, the thread rubber tends to break when being wound to form the core material.

A ratio (t/T) of thickness t of thin sheet material 14a obtained in the calendering step with respect to thickness T of sheet material 14 obtained in the extruding step is preferably from 0.03 to 0.5, and more preferably at least 0.05 and not greater than 0.3. If the value of t/T is less than 0.03, a large volume of rubber composition tends to accumulate at an inlet for upper roll 16 and lower roll 17. This will cause irregularities in thickness of thin sheet 14a in its width direction. If the value of t/T exceeds 0.5, the amount of the rubber being supplied to upper roll 16 and lower roll 17 becomes insufficient. This will cause inconvenience that thin sheet material 14a will become uneven in thickness, and even split off partially.

Thin sheet material 4a, 4c obtained in the calendering step then undergoes the vulcanizing step. It is vulcanized by known vulcanizing means, such as a vulcanizer, to form a vulcanized sheet. This vulcanized sheet is cut into a prescribed width, and the thread rubber is thus obtained.

Figure 3:
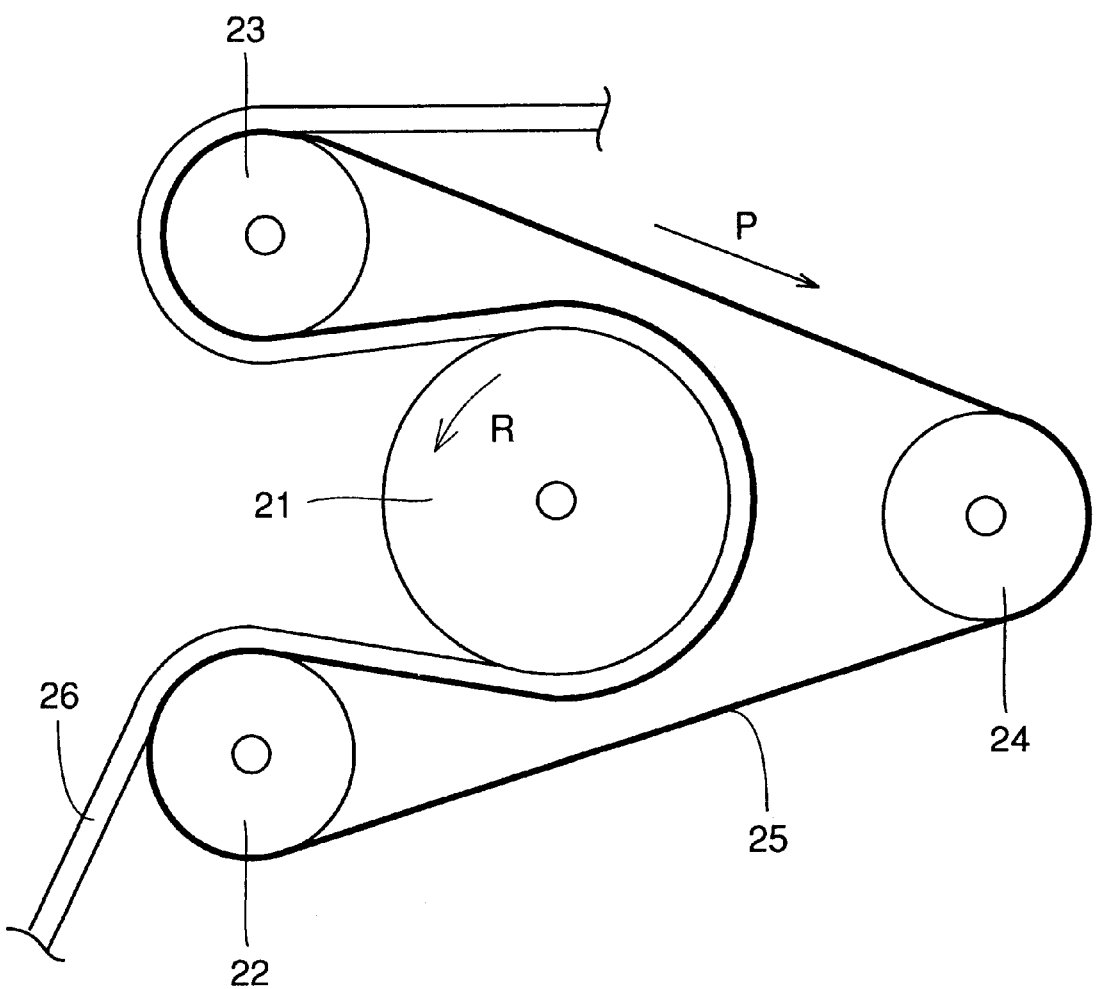
FIG. 3 schematically illustrates a vulcanizing step in manufacture of the thread rubber.

In the present invention, continuous vulcanization may be utilized instead of the vulcanizing method as described above. FIG. 3 is a schematic diagram showing a continuous vulcanizing device for use in the vulcanizing step. This continuous vulcanizing device includes a heating roller 21, first, second and third auxiliary rollers 22, 23 and 24, and a belt 25. Heating roller 21 rotates in a direction shown by an arrow R. Belt 25 is an endless belt, which is welded by pressure to heating roller 21 at a constant pressure. Belt 25 rotates in a direction shown by an arrow P, in synchronization with the rotation of heating roller 21. Examples of such continuous vulcanizing devices are the rote-cure type device available from Adamson Corporation in the USA, and the AUMA rotary press available from Berstorff in Germany.

In the continuous vulcanizing device, the rubber composition 26 in a sheet form is first provided on belt 25 in the proximity of first auxiliary roller 22. With the movement of belt 25 in the P direction, rubber composition 26 is brought to contact heating roller 21. Rubber composition 26 moves forward in the state being interposed between this heating roller 21 and belt 25. While rubber composition 26 is directly contacting heating roller 21, heat is transmitted from heating roller 21 to rubber composition 26. This causes vulcanization reaction, so that a vulcanized sheet material is obtained. The rotation speed of heating roller 21 is adjusted so as to adjust the time of vulcanization, or, the time during which rubber composition 26 is kept to directly contact heating roller 21. Thereafter, the vulcanized sheet material is detached from heating roller 21, brought to the proximity of second auxiliary roller 23, and then detached from belt 25.

Pressure is applied to rubber composition 26 while it is being interposed between heating roller 21 and belt 25. Such pressure serves to reduce the surface roughness of the vulcanized sheet material. The pressure being applied is preferably from 0.03 MPa to 1 MPa, and more preferably from 0.1 MPa to 0.3 MPa. If the pressure is less than 0.03 MPa, the effect to reduce the surface roughness of the vulcanized sheet material will be insufficient. If the pressure exceeds 1 MPa, the modulus of the thread rubber will become too high. The pressure can be adjusted by adjusting the position relationship of heating roller 21 and first, second and third auxiliary rollers 22, 23 and 24, or by adjusting the rotation speed of first and second auxiliary rollers 22 and 23.

As the belt 25, any of a metal belt, a rubber belt reinforced by fabric or metallic wire, a felt belt and others may be used. For reduction of the surface roughness of the sheet material, belt 25 with small surface roughness is desirable.

The temperature at vulcanization in the continuous vulcanizing device is preferably between 140° C. and 160° C. If it is less than 140° C., vulcanization will take a long time, thereby degrading productivity. If it exceeds 160° C., the sheet will be overcured, and the fundamental characteristics of the thread rubber will be deteriorated. Vulcanization by the continuous vulcanizing device usually takes 3 to 20 minutes.

With the continuous vulcanizing device, the sheet rubber composition is kept in direct contact with the heating roller during the vulcanization. Thus, unlike the conventional case where an uncrosslinked rubber sheet is wound around the roller and subjected to vulcanization with a vulcanizer and therefore heat conduction differs for the inner and outer sides, variation in the degree of vulcanization can be alleviated.

EXAMPLES (1) Preparation of Thread Rubber Composition

A variable of natural rubber (pale crepe), a variable of polyisoprene rubber (brand name: IR 309; available from Shell Company), 3 parts by weight of sulfur, 1 part by weight of antioxidant (Noclac 200; available from Ouchishinko Chemical Industrial Co., Ltd.), a variable of vulcanization accelerator (Noccelar D, Noccelar CZ; both available from Ouchishinko Chemical Industrial Co., Ltd.), and a fixed amount of zinc oxide (Zinc Oxide #1; available from Sakai Chemical Co., Ltd.) were introduced into a kneader, and kneaded to obtain a rubber composition. Specific ingredients of Examples and Comparative examples are shown in Table 1.

(2) Production of Thread Rubber

The rubber composition was shaped into a ribbon, which was introduced into a cylinder of a roller head extruder. The rubber composition was extruded from the head portion provided with a cap having a thickness of 4 mm and a width of 200 mm, and a sheet material of a width of 300 mm, a length of 30 m and a thickness adjusted as desired was obtained. The temperature within the cylinder was set to 70° C., and the temperature of the head portion was set to 90° C. The temperature of the rollers was set to 90° C., and the rotation speed of the screw was set to 10 rpm.

The sheet rubber composition thus obtained was subjected to continuous vulcanization using a continuous vulcanizing device as shown in FIG. 3 (the rote-cure type device of Adamson Corporation). The vulcanization was conducted at 150° C. for 5 minutes, applying a pressure of 0.2 MPa. The vulcanized sheet material was then cut into a width of 2 mm to obtain vulcanized thread rubber.

(3) Fabrication of Center 100 parts by weight of polybutadiene rubber (BR 01; available from JSR), 5 parts by weight of zinc oxide (Zinc Oxide #1; available from Sakai Chemical Co., Ltd.), 75 parts by weight of barium sulphate, 0.2 parts by weight of vulcanization accelerator (Noccelar CZ; available from Ouchishinko Chemical Industrial Co., Ltd.) and 9 parts by weight of sulfur were kneaded and vulcanized at 150° C. for 30 minutes. A center having a diameter of 32 mm was thus obtained.

(4) Fabrication of Thread-Wound Core

The thread rubber obtained by (2) above was elongated by 1000% and wound around the center obtained by (3) above, so that a thread-wound core of 39 g was obtained.

Physical properties of the thread rubber sheet material obtained above were evaluated in the following manners.

(1) Measurement of Deformation by Compression of Core Material

A load of 980N was applied to the thread-wound core material obtained above, to measure deformation of the core material. The measurement was conducted for 10 core materials, and an average value thereof is shown in Table 1.

(2) Measurement of Coefficient of Restitution of Core Material

The core material of 39 g obtained above was hit by a hollow circular cylinder of aluminum with a mass of 200 g at a speed of 40 m/s. The coefficient of restitution of the core material was calculated according to the momentum conservation law. The measurement was conducted for 10 core materials, and an average value thereof is shown in Table 1.

TABLE 1

|  |  | Comparative examples | | | Examples | | | | | | |
|---|---|---|---|---|---|---|---|---|---|---|---|
|  |  | 1 | 2 | 3 | 1 | 2 | 3 | 4 | 5 | 6 | 7 |
| Ingredients | Polyisoprene rubber (IR 309) *1) | 40 | 50 | 50 | 50 | 50 | 580 | 80 | 80 | 100 | 100 |
|  | Natural rubber (pale crepe) *2) | 60 | 50 | 50 | 50 | 50 | 20 | 20 | 20 | — | — |
|  | Cis 1,4 bond content in rubber component (%) | 95.72 | 95.1 | 95.1 | 95.1 | 95.1 | 93.24 | 93.24 | 93.24 | 92.0 | 92.0 |
|  | Trans 1,4 bond content in rubber component (%) | 1.2 | 1.5 | 1.5 | 1.5 | 1.5 | 2.4 | 2.4 | 2.4 | 3.0 | 3.0 |
|  | Zinc Oxide #1 | 1 | 1 | 1 | 1 | 1 | 1 | 1 | 1 | 1 |  |
|  | Noclac 200 (Antioxidant) | 1 | 1 | 1 | 1 | 1 | 1 | 1 | 1 | 1 | 1 |
|  | Noccelar D (Vulcanization accelerator) | 1 | 1 | 1 | 1 | 1 | 1 | 1 | 1 | 1 | 1 |
|  | Noccelar CZ (Vulcanization accelerator) | 0.5 | 0.5 | 1.5 | 0.5 | 0.5 | 0.5 | 0.5 | 1.0 | 0.5 | 0.5 |
|  | Sulfur | 3 | 0.7 | 0.7 | 1.0 | 3 | 0.9 | 3 | 1.6 | 1.6 | 3 |
| Crosslinked density | Polysulfide bonds ($\times 10^{-8}$ mol) | 2.42 | 0.75 | 0.59 | 1.01 | 2.53 | 0.92 | 2.63 | 1.42 | 1.78 | 2.49 |
|  | Monosulfide bonds ($\times 10^{-8}$ mol) | 0 | 0 | 0.25 | 0 | 0 | 0 | 0 | 0.24 | 0 | 0 |
|  | Total crosslinks ($\times 10^{-8}$ mol) | 2.42 | 0.75 | 0.84 | 1.01 | 2.53 | 0.92 | 2.63 | 1.66 | 1.78 | 2.49 |
|  | (Polysulfide bonds)/(Total crosslinks) (%) | 100 | 100 | 70 | 100 | 100 | 100 | 100 | 85.5 | 100 | 100 |
| Evaluation | Deformation by compression (mm) | 2.91 | 3.02 | 3.11 | 2.95 | 2.84 | 3.02 | 2.87 | 2.91 | 2.94 | 2.89 |
|  | Coefficient of restitution | 0.7923 | 0.7824 | 0.7659 | 0.8044 | 0.8187 | 0.8077 | 0.8211 | 0.8013 | 0.8258 | 0.8311 |

*1) Polyisoprene rubber Cis 1,4 bond content: 92%, Trans 1,4 bond content: 3%
*2) Natural rubber Cis 1,4 bond content: 98.2%, Trans 1,4 bond content: 0%

The results in Table 1 show that, although Examples 1–7 exhibit the deformation by compression from 2.84 to 3.02 that is almost at the same level as in Comparative examples 1–3, the impact resilience (coefficient of restitution) in Examples 1–7 is considerably increased compared to Comparative examples 1–3.

As explained above, according to the present invention, the cis 1,4 bond content in the rubber component such as polyisoprene rubber is set within a prescribed range, and the crosslinked density of polysulfide bonds is made high. Accordingly, the decrease of rubber elasticity of the thread rubber due to elongation when being wound around the center is alleviated, and therefore, a golf ball with high impact resilience can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vulcanized thread rubber composition obtained by vulcanizing a thread rubber composition including at least 50 wt % of polyisoprene rubber having a cis 1,4 bond content of from 80% to 95% and a trans 1,4 bond content of from 2% to 4% within a rubber component, wherein a ratio of a crosslinked density of polysulfide bonds with respect to a total crosslinked density in the vulcanizate is more than 70%.

2. The vulcanized thread rubber composition according to claim 1, wherein the crosslinked density of the polysulfide bonds is in a range between $0.8 \times 10^{-8}$ mol/mm$^3$ and $3 \times 10^{-8}$ mol/mm$^3$.

3. The vulcanized thread rubber composition according to claim 1, wherein an average cis 1,4 bond content within the rubber component is from 90% to 96% and an average trans 1,4 bond content within the rubber component is from 0.5% to 3.0%.

4. The vulcanized thread rubber composition according to claim 1, wherein the total crosslinked density is in a range between $0.8 \times 10^{-8}$ mol/mm$^3$ and $3 \times 10^{-8}$ mol/mm$^3$, and the ratio of the crosslinked density of the polysulfide bonds with respect to the total crosslinked density is more than 70%.

5. The vulcanized thread rubber composition according to claim 1, obtained by vulcanizing the rubber composition by continuous vulcanization at a pressure between 0.3 MPa and 1 MPa and at a temperature between 140° C. and 160° C.

6. The vulcanized thread rubber composition according to claim 1, wherein a ratio of a blended amount of vulcanized accelerator with respect to a blended amount of sulfur (vulcanization accelerator/sulfur) within the rubber composition before vulcanization is less than 2.

7. A golf ball obtained by elongating a vulcanized thread rubber composition for winding around a center to form a core material, and enveloping the core material with a cover, wherein said vulcanized thread rubber composition is obtained by vulcanizing a thread rubber composition including at least 50 wt % of polyisoprene rubber having a cis 1,4 bond content of from 80% to 95% and a trans 1,4 bond content of from 2% to 4% within a rubber component, and a ratio of a crosslinked density of polysulfide bonds with respect to a total crosslinked density in the vulcanizate is more than 70%.

* * * * *